United States Patent [19]

Jordan

[11] Patent Number: 4,613,097

[45] Date of Patent: Sep. 23, 1986

[54] RIGID WING FLYING CRAFT

[75] Inventor: Heinz Jordan, Wölfnitz bei Klagenfurt, Austria

[73] Assignee: Technische Gerate-u. Entwicklungsgesellschaft m.b.H, Klagenfurt, Austria

[21] Appl. No.: 524,460

[22] Filed: Aug. 18, 1983

[30] Foreign Application Priority Data

Aug. 30, 1982 [AT] Austria .................................. 3243/82

[51] Int. Cl.[4] ...................... B64C 11/00; B64C 15/12; B64C 29/00
[52] U.S. Cl. ................................... 244/12.4; 244/15; 244/56
[58] Field of Search ................... 244/12.1, 12.4, 23 R, 244/23 A, 15, 34 A, 56

[56] References Cited

U.S. PATENT DOCUMENTS

| | | | |
|---|---|---|---|
| 1,822,386 | 9/1931 | Andersen | 244/12.4 |
| 1,957,896 | 5/1934 | Marguglio | 244/23 R |
| 3,002,709 | 10/1961 | Cochran | 244/15 |
| 3,049,320 | 8/1962 | Fletcher | 244/12.4 |
| 3,058,693 | 10/1962 | Doak | 244/23 A |
| 3,335,977 | 8/1967 | Meditz | 244/12.4 |

FOREIGN PATENT DOCUMENTS

| | | |
|---|---|---|
| 370050 | 2/1983 | Austria . |
| 1506048 | 7/1969 | Fed. Rep. of Germany . |
| 1556403 | 1/1970 | Fed. Rep. of Germany . |
| 708738 | 5/1954 | United Kingdom ............... 244/12.1 |

*Primary Examiner*—Trygve M. Blix
*Assistant Examiner*—Rodney Corl
*Attorney, Agent, or Firm*—Frost & Jacobs

[57] ABSTRACT

The invention relates to a rigid wing flying craft having at least one airfoil and at least one driving unit and a cabin for receiving loads. At least one air channel piercing the airfoil is provided in the surface center of the airfoil and at least two steering fins for steering the flight movements are pivotably supported in the air channel. The driving unit and the steering fins are arranged at least partially within said air channel and pivotably supported within the same around an axis of rotation which extends essentially vertically in relation to the axis of the driving unit.

4 Claims, 5 Drawing Figures

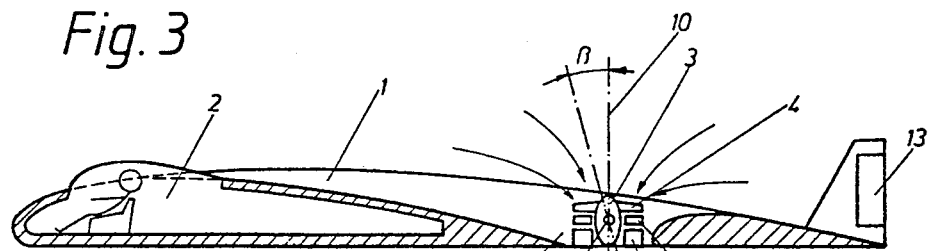
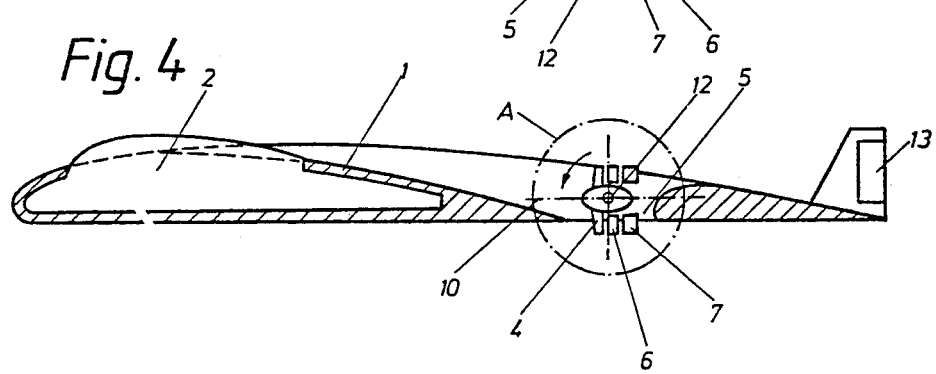
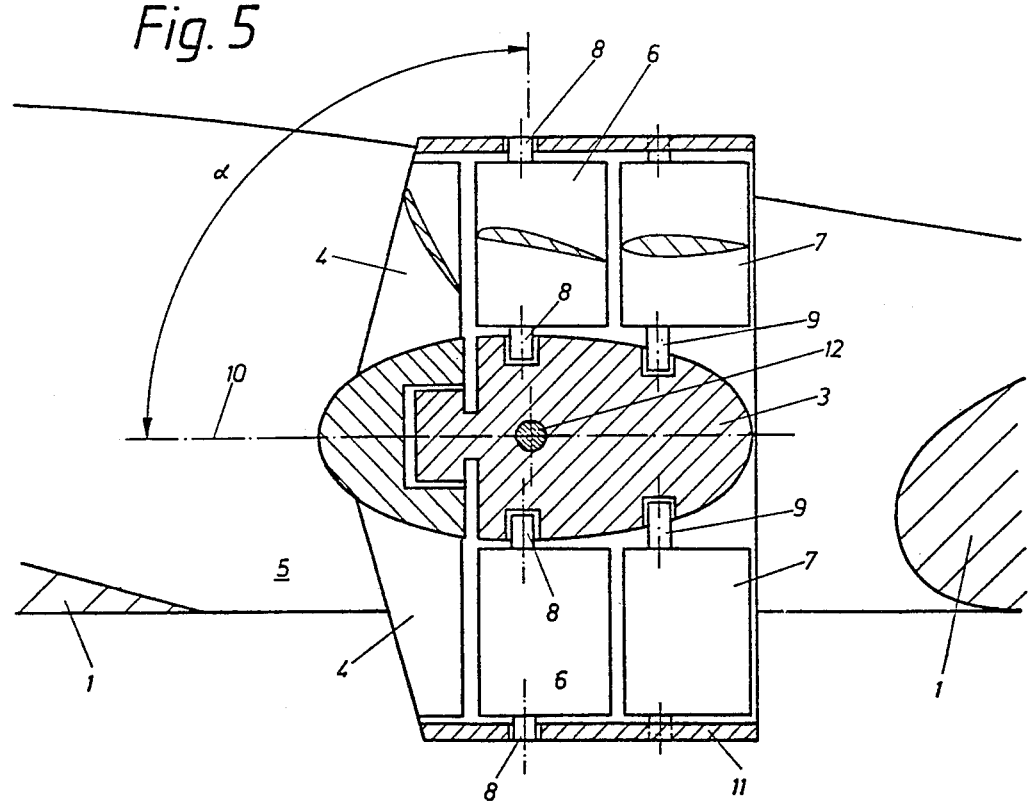

RIGID WING FLYING CRAFT

This invention relates to a rigid wing flying craft comprising at least one airfoil and at least one driving unit such as a propeller or turbine and a cabin for receiving loads.

Known vertically starting airplanes require high propulsion plant capacity for vertical flight, as high energy losses occur due to thrust deflection. Moreover, the propulsion plant thrust must be essentially higher than the take-off weight.

In order to overcome these disadvantages, a flying craft has been proposed in which the propeller is arranged spacially above the guide vane rings, the upper vane ring being attached to the driving unit only and the lower vane ring beint attached to the supporting means, on the one hand, and to a supporting plate or the like for the driving unit, on the other hand, with the supporting plate or the like being rotatably supported on the driving unit (published Austrian patent specification A 537/80).

In the known flying craft of the type initially mentioned (German Offenlegungsschrift 1506048) the driving unit with the screw is suspended pivotably in relation to the fuselage by about 60° around a horizontal axis extending transversely in relation to the propeller axis and by about 45° around a vertical axis extending transversely in relation to the propeller axis. The driving unit is in this case completely outside a the fuselage and the axis of rotation for the driving unit is provided outside of the casing of the driving unit or the propeller. Due to this construction, the flying craft according to German Offenlegungsschrift 1506048 cannot start and land vertically. Moreover, this prior flying craft requires a tremendous amount of energy because the suction flow of the propeller is impaired by the fuselage or the airfoil.

In another prior aircraft, which is described in German Offenlegungsschrift 1556403, separate propulsion plants for vertical and horizontal flight are provided, as the energy requirement would be too great otherwise.

It is the object of the invention to eliminate these disadvantages and to provide a flying craft which can start and land vertically and wherein the propulsion plant thrust on starting can be equal to or less than the take-off weight.

The rigid wing flying craft according to the invention comprises at least one airfoil and at least one driving unit and a cabin for receiving loads, wherein at least one air channel piercing the airfoil and/or the cabin is provided generally in the surface center of the airfoil for the airstream generated by the driving unit and at least two steering fins for steering the flight movements are pivotably supported in said air channel, said driving unit and said steering fins being arranged at least partially within said air channel and pivotably supported within the same around an axis of rotation which extends essentially perpendicular to the axis of the driving unit so that said driving unit is pivotably supported to at least one inclined position in relation to the airfoil.

The object of the invention is thus provided with an air channel which is arranged virtually in the surface or lift center of the airfoil and the entire driving unit is pivotable within this air channel. These features provide the following advantages: The flying craft according to the invention can start and land vertically and moreover reach a high horizontal flying speed. The object of the invention requires one single driving unit and must less thrust power than the aircraft according to German Offenlegungsschrift 1506048.

According to the invention, a vertical start can be achieved by pivoting the steering fin(s) arranged within the air channel or air passage or at the mouth of same, while the transition from the vertical start to the horizontal travelling direction can be achieved without pivoting the driving unit. The counter torque of the driving unit can be taken up by the guide vane ring at standing airfoil.

An air passage can be provided instead of the air channel.

The driving unit can be provided with a coaxial guide vane system for the generation of the counter torque.

It is practical to arrange the driving unit, the steering fins and the coaxial guide vane system within a common, in particular ring-shaped shell spacially surrounding them and pivotably supported in relation to the airfoil by means of the axis of rotation.

In order to neutralize the counter torque, it is of advantage to provide for the radial guide vanes of the guide vane system to be supported, preferably jointly, pivotably around axes which are essentially perpendicular to the axis of the driving unit.

The steering fins for steering the flight movement can also be pivotably supported around axes which are essentially perpendicular to the axis of the driving unit.

It is of advantage to pivotably support the guide vanes of the guide vane system serving for the generation of the counter torque on the driving unit, on the one hand, and on the shell surrounding them, on the other hand, while the steering fins are optionally pivotably supported on the driving unit only. The steering fins can also be disposed on the shell.

For optimal steering, it is of advantage to functionally couple, for instance by means of a servo means, the guide vane system serving for the generation of the counter torque with a tail unit arranged in particular on the tail side of the airfoil.

It is also of advantage to provide for the axis of the driving unit and the axis of the air channel or air passage to be disposed in the longitudinal center plane of the symmetrically shaped airfoil. The axes can also be disposed higher and lower.

An embodiment favorable in respect of the air flow provides for the airfoil to be of decreasing height or thickness from its front side or tip pointing in flight direction in the direction of the air channel or air passage whose width increases frontward in flight direction.

It is of advantage to provide for the tail-side rim of the air channel to be formed by a rounded-off portion of the airfoil.

It is also of advantage if the pivot angle of the driving unit around the axis of rotation is one of 90°. This angle permits the vertical starting and landing with one single propulsion plant and a high horizontal flying speed.

The invention is explained in detail under reference to the drawing showing an exemplary embodiment of the object of the invention.

FIG. 3 is a section along line III—III in FIG. 1 at essentially vertically arranged axis of the driving unit;

FIG. 4 is a view analogous to FIG. 3 with the axis of the driving unit pivoted by about 90° to the horizontal and FIG. 5 shows detail A of FIG. 4 at enlarged scale.

Figure 1:
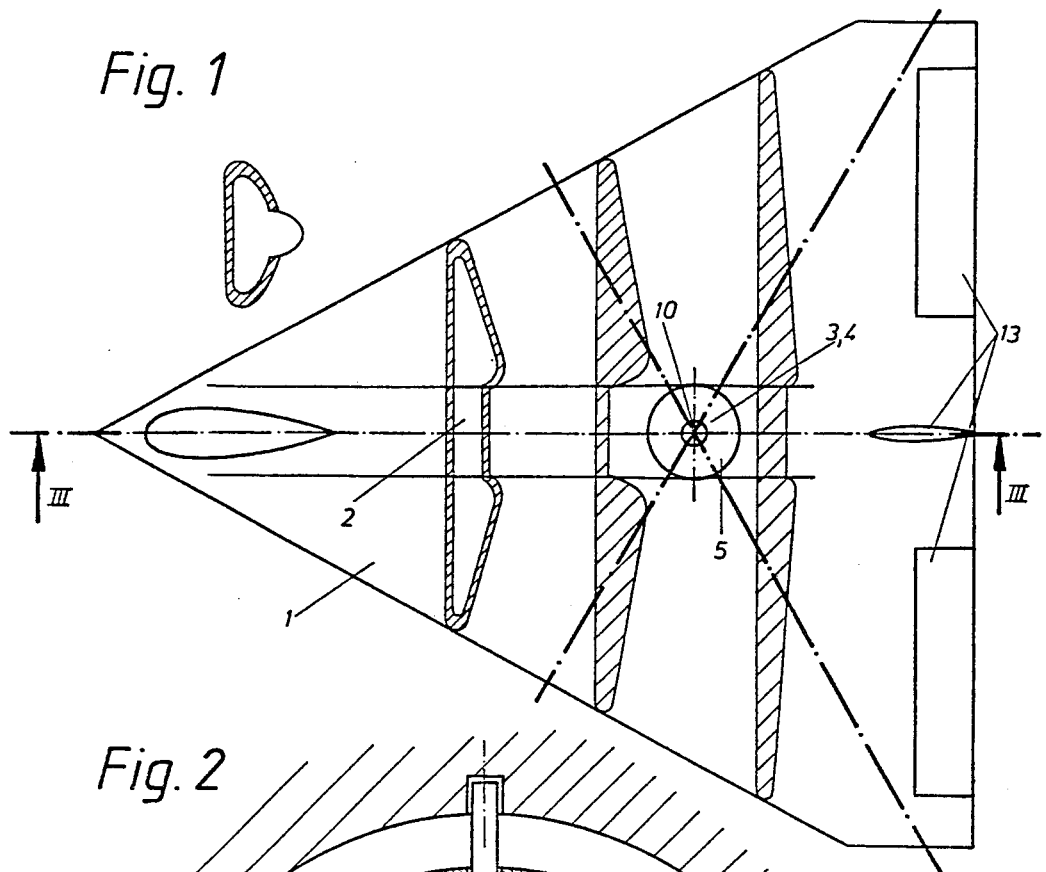
FIG. 1 is a top view of the flying craft according to the invention.
Figure 2:
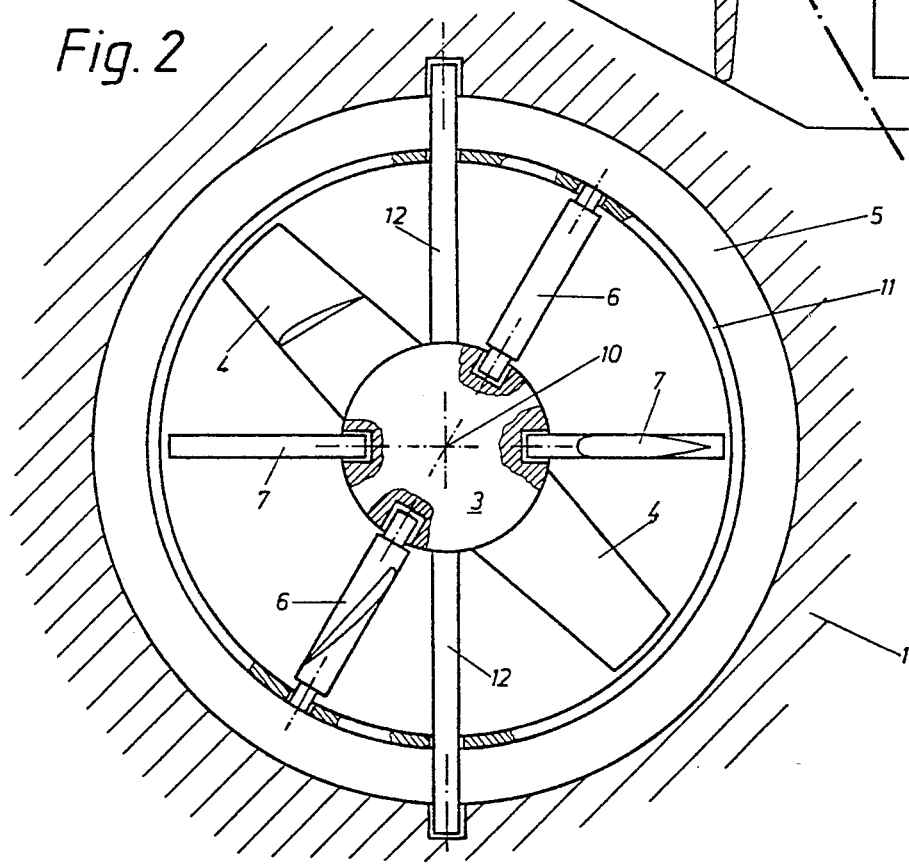
FIG. 2 is a top view of the driving unit including the air channel at enlarged scale and partially sectional view.

The flying craft shown comprises an airfoil 1 which is delta-shaped in top view on cabin 2 for receiving load arranged in or above the airfoil plane. The aerodynamic lift is generated by the movement of the entire flying craft with the rigid airfoil attached to the cabin in relation to the surrounding air. For this reason, the flying craft is termed rigid wing flying craft.

The flying craft is driven by a driving unit 3 with a propeller 4. A turbine could be provided instead of the propeller.

The driving unit 3 with the propeller 4 is arranged within an air channel or air passage 5 piercing the airfoil 1 having the cross section of an airfoil profile. The axis of the air channel 5 extends essentially perpendicular to the airfoil plane, i.e. essentially vertically in vertical flight position. In airflow direction, a guide vane system 6 having at least two guide vanes is disposed in axial distance behind the propeller 4 for neutralizing the counter torque, and three steering fins 7 are arranged in axial distance from the guide vanes for steering the flight movements.

The guide vanes of the guide vane system 6 are pivotably supported around axes 8 essentially perpendicular to the axis of the driving unit 3 and the steering fins 7 are pivotably supported around axes 9 essentially perpendicular to the driving unit 3. The central axis of the entire guide vane system extends coaxially in relation to the axis 10 of the driving unit 3. The driving unit 3 with the propeller 4, the guide vane system 6 and the steering fins 7 are arranged in a common ring-shaped shell 11 spacially surrounding these building elements and the driving unit 3 with the propeller 4, the guide vane system 6 and the steering fins 7 as a whole are pivotable around an axis 12 extending essentially perpendicular to the axis 10 of the driving unit 3. The angle of rotation bears the symbol $\alpha$ in FIG. 5. The guide vanes 6 are supported on the driving unit 3, on the one hand, and on the shell 11, on the other hand, while the steering fins 7 are supported on the driving unit 3 only. The fins 7 could also be supported on the shell, as shown in broken lines in FIG. 5.

The guide vane system 6 is arranged at an axial distance from the steering fins 7 and is functionally coupled by means of a servo means not shown in detail with a tail unit 13 disposed on the tail side of the airfoil 1.

The axis of rotation 12 of the driving unit 3 is arranged within the airfoil 1, i.e. between its top face and bottom face, and estends at least approximately parallel in relation to the bottom side of the airfoil 1. The air channel 5 is formed in the surface or lift center of the airfoil 1, the front rim of the air channel 5 is formed of an essentially pointed tapering airfoil portion and the tailside rim of the air channel 5 is formed of a rounded-off portion of the airfoil 1.

In operation of the flying craft, the air is sucked off from the top side of the airfoil and pressed downward through the air channel. Due to the sub pressure on the top side of the airfoil and the generated air stream, this surface is supporting at vertical start as well. The counter torque of the driving unit can be neutralized by means of the guide vanes so that the airfoil will not move around the axis of the driving unit. By adjustment of the guide vanes, the counter torque can be more or less neutralized, steering of the flying craft is possible via the vertical axis.

Many variants are possible within the scope of the invention. In particular, the driving unit does not have to be pivotable: it suffices for the driving unit to be inclined with its axis frontward; this position is shown in FIG. 3 with dash-dotted lines, the angle of inclination bears the reference symbol $\beta$. In this case, the driving unit can be arranged rigidly in relation to the airfoil.

The cabin can be formed in one piece with the airfoil, for instance in a cavity of same. But it could also have the form of a pivotably supported gondola. The cabin and/or the airfoil can be provided with a landing gear. The airfoil can have any given form such as essentially triangular or rectangular, it can also be domed or curved.

Suitable driving units are fan motors or turboprop-, gasoline or electromotors. The propeller should have at least two blades.

The arrangement of the guide vane system and the steering fins in relation to the driving unit could be modified: they could also be arranged on the suction side of the driving unit or the driving unit could be arranged in airflow direction between guide vane system and steering fins. Preferably, four or more steering fins are provided.

The height of the air channel can be equal to or greater or smaller than the thickness of the airfoil. It would also be possible to merely provide an air passage.

The driving unit could also be attached to the airfoil or the cabin by means of a supporting structure.

The flying craft according to the invention has the same properties of vertical start and vertical landing as a helicopter, it therefore does not require any starting or landing runways and assures greater safety and better exploitation of the motor capacity as compared to known flying crafts. The object of the invention handles vertical start and vertical landing as well as horizontal flight with one single motor (elimination of the problems arising from balancing of the engine and utilization of this additional energy for vertical or horizontal speed), its horizontal flight properties are optimal.

I claim:

1. A rigid wing flying craft comprising at least one airfoil, at least one driving unit and a cabin for receiving loads, wherein at least one air channel piercing the airfoil is provided generally in the surface center of the airfoil for the airstream generated by the driving unit, at least two steering fins for steering flight movements are pivotally supported in the air channel near the mouth thereof, a radial guide vane system with guide vanes is provided coaxial with the axis of said driving unit for generating a counter torque, said steering fins and said guide vanes are pivotally supported around axes of rotation extending essentially perpendicular to the axis of said driving unit, said driving unit is pivotally supported to at least one inclined position in relation to said airfoil, and a common shell is provided surrounding said driving unit, guide vane system and steering fins whereby said steering fins are located in the airstream at any position of said driving unit, wherein said guide vanes are pivotally supported on said driving unit, on the one hand, and on said common shell, on the other hand, while said steering fins are pivotally supported on said driving unit only.

2. A flying craft according to claim 1, wherein the guide vane system for the generation of the counter torque is functionally coupled to a tail unit supported on the tail side of the airfoil.

3. A flying craft according to claim 1, wherein the axis of the driving unit and the axis of the air passage are arranged in the central longitudinal axis of the airfoil.

4. A flying craft according to claim 1, wherein the airfoil is delta-shaped.

* * * * *